Aug. 28, 1956　　　H. E. COOPER　　　2,760,323
DISK HARROW

Filed Jan. 25, 1951　　　　　　　　　　4 Sheets-Sheet 1

Inventor
HUGH E. COOPER
Atty.

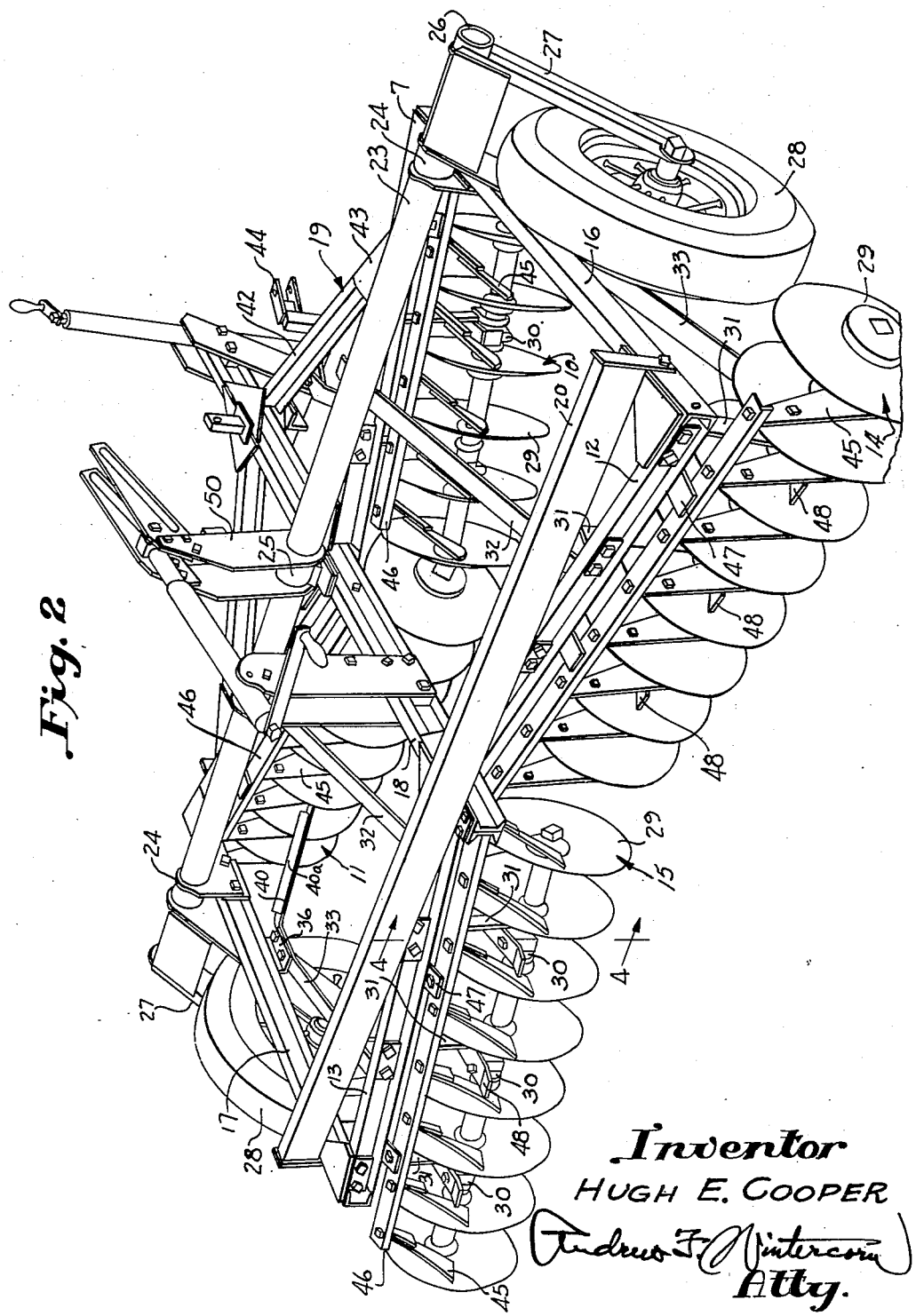

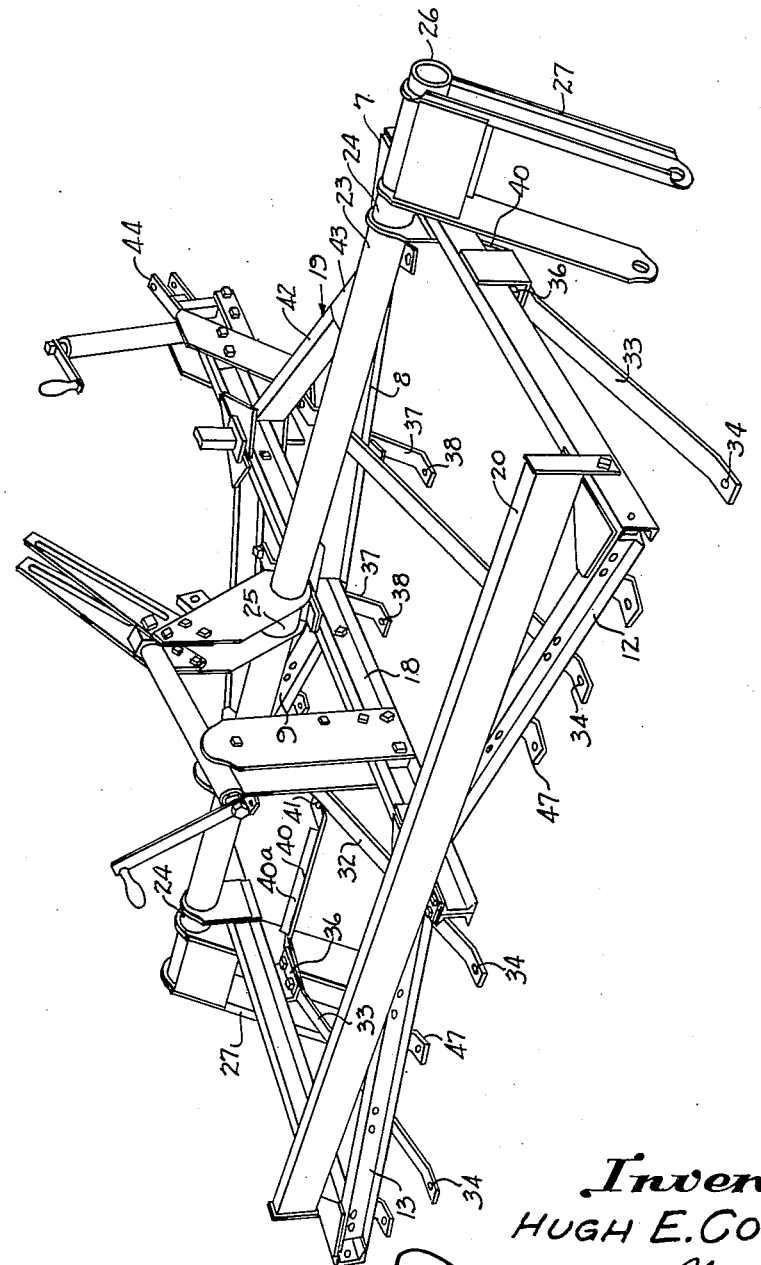

Aug. 28, 1956     H. E. COOPER     2,760,323
DISK HARROW

Filed Jan. 25, 1951     4 Sheets-Sheet 4

Inventor
HUGH E. COOPER
Andrew F. Wintercorn
Atty.

United States Patent Office 2,760,323
Patented Aug. 28, 1956

2,760,323

DISK HARROW

Hugh E. Cooper, Rochelle, Ill.

Application January 25, 1951, Serial No. 207,719

6 Claims. (Cl. 55—73)

This invention relates to a new and improved wheel mounted disk harrow.

The principal object of my invention is to provide a wheel mounted disc harrow of more compact design, with a view to economy in construction, economy in shipping space and costs, and a shorter turning radius for a given width implement of a fixed angle type. For example, a ten foot implement designed to cover four corn rows at one time when made in accordance with my invention can be turned within a radius heretofore required for a seven foot implement. I have attained this objective with a combination of the following novel features:

(1) The sides of the hitch are connected to the frame inwardly from the side portions thereof instead of from the outer sides, thus shortening the hitch length overall and obtaining not only greater overall compactness and a shorter turning radius but also lighter draft;

(2) Push-bars are provided attached to the side members of the frame and extending forwardly and inwardly for connection with the front gangs inwardly from the outer ends thereof but outside the width of the hitch, thereby enabling making the frame narrower and at the same time shortening the hitch and distributing the pull, part of the pull in so far as the front gans are concerned being taken in compression loading of the push-bars and the rest being taken in tension on the hitch. Pull-bars, attached to the inner ends of the front gangs, are connected to assume the pull for the inner end portions of the front gangs. The push-bars take the place of pull-bars that would otherwise be required in connection with the outer end portions of the front gangs and enable shortening the frame considerably by eliminating the extra length of frame that would be required in front of the front gangs for connection with pull-bars;

(3) The supporting wheels are located outside the frame so that the front and rear gangs can be located closer together, thus enabling further shortening of the frame, the wheels, however, being still within the width of ground cut by the rear gangs, so that no wheels tracks are left in the field.

Another object is to provide a large shaft transversely of the top of the frame over the front gang for mounting the supporting wheels on forks on the outwardly projecting ends thereof, while at the same time trussing the frame by having the shaft working in coaxially aligned large bearings on the central frame member and the opposed side frame members, the frame being further rigidified and reinforced by means of a large channel member extending transversely of the top of the frame over the rear gang and fastened securely at its middle to the central frame member and at its ends to the opposed side frame members and also abutting the top of the angularly extending rear cross-members of the frame intermediate the ends thereof for still further rigidity and strength.

Still another object is to provide an improved depth control utilizing a one-way hydraulic cylinder for operating the oscillating wheel forks to lift the gangs of disks out of the ground quickly or just as quickly lower them under manual control, the depth of disking being easily and accurately adjusted by means of a hand crank on a jack screw which sets a stop-pin working in a slot on an arm that oscillates with the wheel forks, whereby to limit the oscillatory movement of these forks and, accordingly, determine the depth of disking.

The invention is illustrated in the accompanying drawings, in which—

Fig. 2 is a perspective view of the harrow taken from the rear showing the wheel forks partially raised to allow for shallow disking;

Fig. 3 is a rear perspective view of the harrow frame assembly, showing the wheel forks lowered, as for transportation of the harrow on the highway and over grass waterways;

The same reference numerals are applied to corresponding parts throughout the views.

Figure 1:
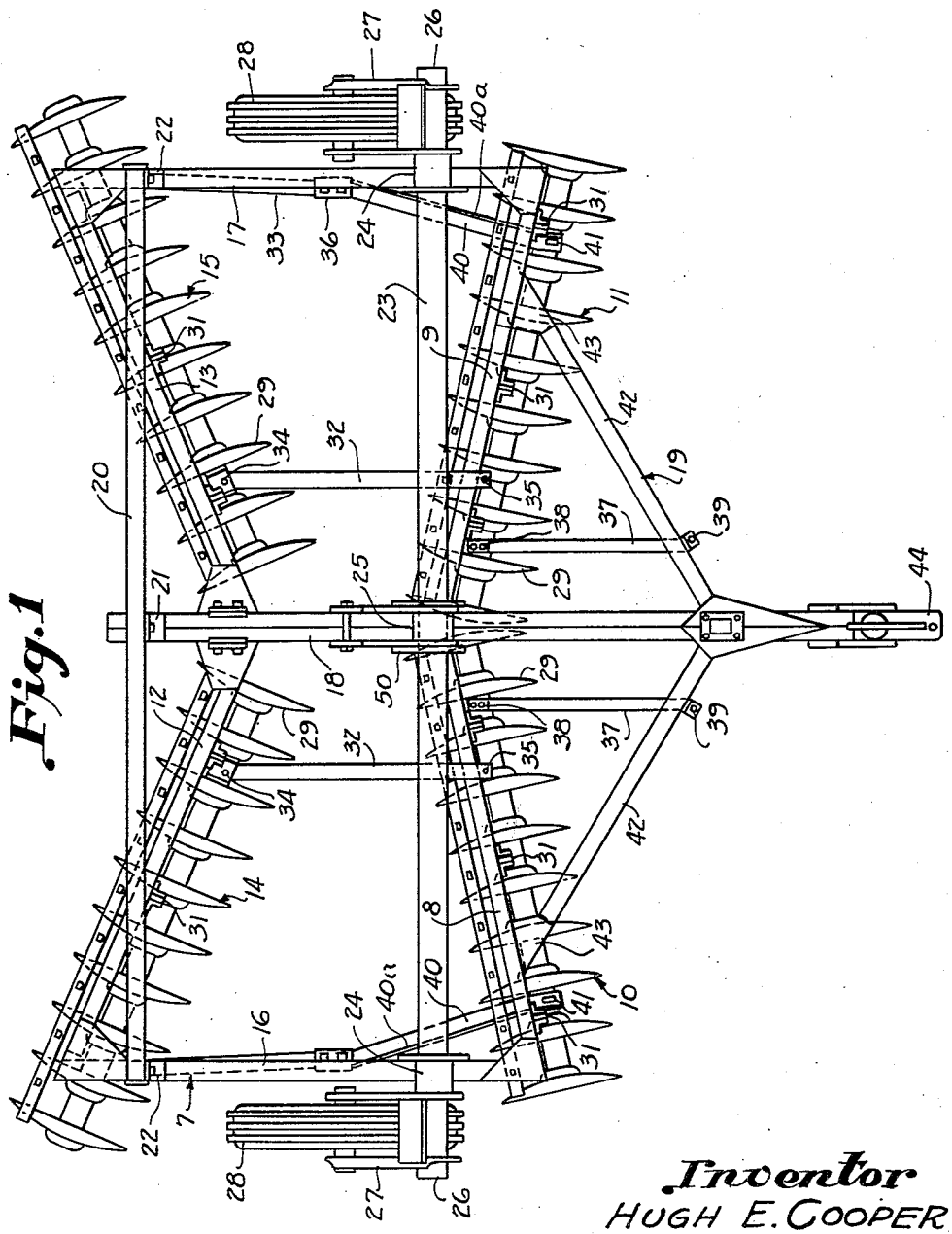
Fig. 1 is a plan view of a wheel mounted disk harrow made in accordance with my invention.
Figure 5:
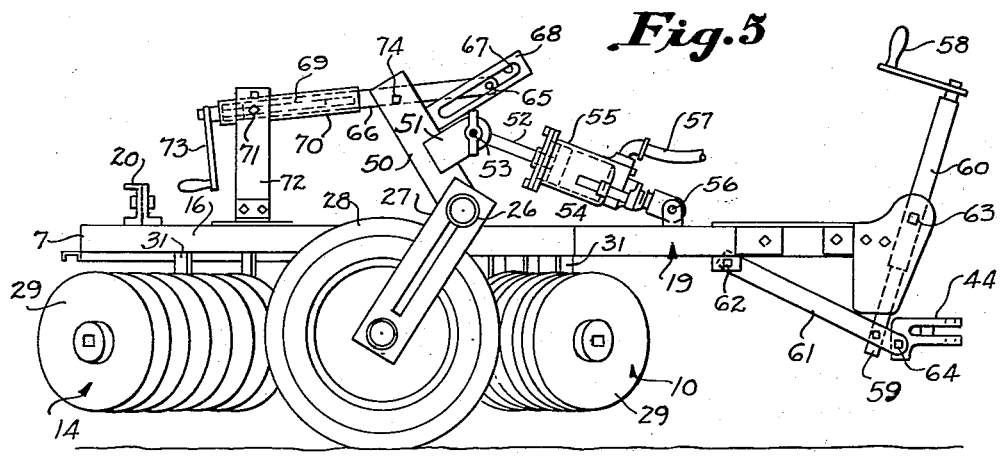
Figs. 5 and 6 are side views of the harrow illustrating the operation of the one-way cylinder depth control, the harrow having the disks raised in Fig. 5 for transportation and lowered in Fig. 6 for disking.

Referring to the drawings, and mainly to Figs. 1 to 3, the reference numeral 7 designates the frame made from channel irons. The frame is of hour-glass form, so as to dispose the front cross-members 8 and 9 in parallelism with the axes of the front gangs 10 and 11, and dispose the rear cross-members 12 and 13 parallel to the axes of the rear gangs 14 and 15, respectively. Parallel side members 16 and 17 are suitably connected to the outer ends of the front and rear cross-members, and a central member 18, parallel to the side members, is suitably connected to the inner ends of the front and rear cross-members and extends forwardly from the frame to form the central part of the hitch 19. A reinforcing rear tie-channel 20 is connected at the middle to the rear end of the central member 18, as at 21, and at its opposite ends to the side members 16 and 17, as at 22, thereby greatly rigidifying and reinforcing the frame. A similar bolstering effect is obtained for the front cross-members 8 and 9 by the extension crosswise of the frame of the tubular wheel pivot shaft 23, which serves as a torque tube for resilient suspension of the frame 7 without any other springs and works in bearings 24 provided on the tops of the side members 16 and 17, and is also received at the middle thereof in a central pivot bearing 25 provided on top of the central member 18 of the frame, very near the junction with that member of the inner ends of the front cross-members 8 and 9. As a result of the sturdy construction of the frame and the way it is cross-braced at 20 and trussed at 23, there is no likelihood of the frame breaking, bending, or loosening up even in roughest service. The projecting end portions 26 of the shaft 23 carry the forks 27 in which the supporting wheels 28 are mounted, and, as will soon appear, provision is made for oscillating the shaft 23 relative to the frame 7 to raise and lower the frame and the gangs of disks with it, the frame being always raised to the same height, as shown in Fig. 5, for transportation, but being lowered to different degrees, according to the depth of disking desired, the maximum depth being illustrated in Fig. 6. The shaft 23 is so located fore and aft of the frame that the harrow is substantially balanced relative to the wheels 28 when elevated for transportation, thereby reducing fatigue in hitching and unhitching and facilitating hauling. The resilience of the elongated torque tube 23 is an important factor accounting for light and more uniform draft, because either or both wheels can rise and fall in relation to the frame in running over an obstruction instead of forcing the whole machine to rise and fall. It also accounts for much more uniformity in the depth of disking and harrowing.

The front and rear gangs of colter disks 10 and 11 are disposed in acute angle relationship to the central member 18, as clearly appears in Fig. 1, the front gangs being much closer together than the rear gangs. The front gangs are, in fact, as close together as possible without bringing the backs of the neighboring disks at the inner ends of the two gangs into contact, the disks 29 of these two gangs being arranged to throw dirt outwardly, whereas the disks 29 in the two rear gangs 14 and 15 are disposed the reverse way to throw dirt inwardly and thus avoid ridging and obtain a better pulverizing and intermingling action. The front gangs 10 and 11 being so closely spaced are disposed substantially within the width of the frame 7, but the rear gangs 14 and 15, which have the same number of disks spaced the same distance, are disposed far enough apart so that the last two disks 29 on each of those gangs serve to remove the tracks that would otherwise be left in the field by the wheels 28 as the back gangs cover up for the front gangs. Light draft is obtained by setting of the disks of the front gangs 10 and 11 at the most favorable smaller angle in relation to forward movement of the harrow for light draft plowing, while the disks of the rear gangs 14 and 15, which only serve to pulverize and gather the ground broken by the front disks, are set at a larger angle more suitable for harrowing. Each of the four gangs 10, 11, 14, and 15 is supported for rotation in three spaced coaxial bearings 30, which are carried on substantially vertical standards 31 extending downwardly from and suitably secured to the associated cross-member of the frame. The rear gangs each have a pair of pull or draw-bars 32 and 33 suitably attached at their rear ends, as at 34, to the innermost and outermost bearings 30 and extending forwardly and upwardly in acute angle relationship to the plane of the frame 7 and suitably connected at the front ends to the frame, the bars 32 being attached to the cross-members 8 and 9 near their inner ends, as at 35, and the bars 33 being attached to the side members 16 and 17 at the approximate midpoints thereof, as indicated at 36. Each of the front gangs 10 and 11 has a pull or draw-bar 37 attached at its rear end to the innermost bearing 30, as at 38, and extending forwardly and upwardly, and attached at its front end to the hitch extension 19 of the frame, as indicated at 39. A push-bar 40 is also provided in connection with each of the front gangs 10 and 11, these bars being attached at their front ends, as at 41, to the outermost bearings 30, the bush-bars extending rearwardly and upwardly as well as outwardly and being attached at their rear ends to the side members 16 and 17 of the frame, as at 36. The pull and push-bars brace the structure and relieve the standards 31 of most of the strain incident to the plowing action of the disks, the pull-bars being, of course, tension members and the push-bars compression members. That is the reason for providing the longitudinal flanges 40a on the push-bars to prevent buckling thereof under compression loading. The arrangement of the pull-bars 32—33 with respect to the rear gangs 14—15 is more or less conventional, but the arrangement of the pull-bars 37 and push-bars 40 with respect to the front gangs and the arrangement of these gangs and the supporting wheels with respect to the frame 7 is all new, as is also the arrangement of the hitch extension 19 of the frame relative to these pull and push-bars. The hitch extension 19 is V-shaped, the two rearwardly divergent arms 42 thereof being attached to the cross-members 8 and 9 of the frame inwardly from the outer ends thereof, as at 43, so as to shorten the coupling length between the frame 7 and the hitch clevis 44 and, accordingly, lighten the draft and shorten the turning radius, the present design giving as short a turning radius for a ten foot implement as was heretofore required for seven foot implements. The push-bars 40 enable a great reduction in length of the frame, inasmuch as the frame would have to extend forwardly in front of the front gangs a distance proportionately to the length of the push-bars 40 if pull-bars equivalent in length to the other pull-bars 32—33 were used, in order to provide anchorage for such pull-bars forwardly relative to these front gangs. The location of the supporting wheels 28 outside the frame enables locating the front and rear gangs of disks closer together, thereby enabling a further and appreciable shortening of the frame, the wheels, nevertheless, being still within the width of ground cut by the rear gangs, so that no wheel tracks will be left in the field. The arrangement of the push-bars extending forwardly and inwardly from the sides of the frame for connection with the front gangs inwardly from the outer ends thereof, but at the outer sides of the hitch, enables further compacting of the structure as a whole, narrowing the frame and shortening the hitch. The arrangement of the push-bars relative to the hitch extension results in good distribution of the pull, part of the pull being assumed as tension loading by the hitch extension 19, to which the pull-bars 37 extending to the inner ends of the front gangs are attached, and the rest being assumed by compression loading on the push-bars 40. The pull so far as the rear gangs are concerned is also nicely distributed, insmuch as the inner pull-bars 32 are attached to the cross-members 8 and 9 near their inner ends where they are anchored to the central member 18, and the outer pull-bars 33 are attached to the side members 16 and 17 of the frame, and, of course, the hitch extension 19 is connected to the front end of the frame near these side members, as at 43.

The usual scraper blades 45 are provided in connection with all of the disks 29, and they are attached to channel iron members 46 attached to the cross-members 12—13 and 8—9 by means of lugs 47. In addition, however, I provide a root ejector blade 48 in connection with each of the three standards 31 fastened to the top of the bearing 30, as indicated at 49, and extending rearwardly and upwardly at an angle of about 30° to the horizontal. These projecting blades 48 prevent corn stalk roots, stones, or any other bulky objects from lodging between the neighboring disks against the backs of the standards and either placing an undesirable drag upon the operation of the harrow or preventing turning of the disks entirely. The roots, stones, and other objects coming in contact with the blades 48 are deflected rearwardly away from the disks harmlessly.

Figure 6:
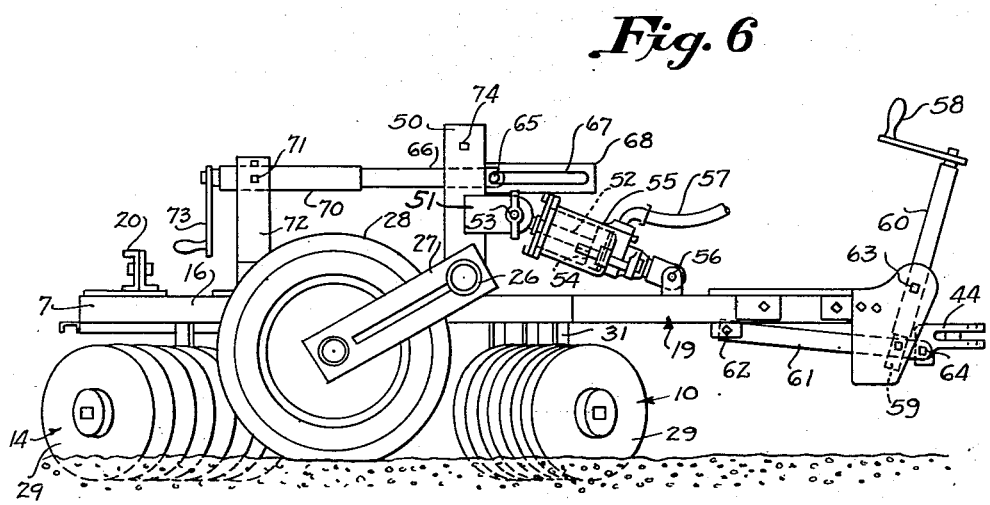
Figure 4:
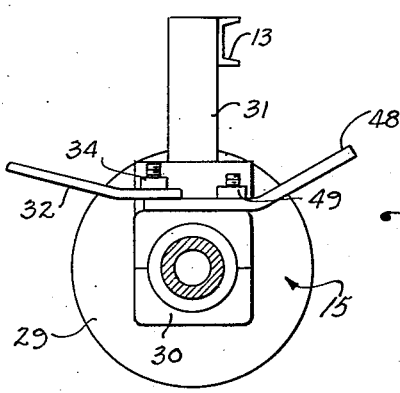
Fig. 4 is a sectional detail on the line 4—4 of Fig. 2, showing one of the root ejectors.

Referring now to Figs. 5 and 6, the cross-shaft 26 has a fork 50 suitably secured to the middle portion thereof straddling the bearing 25, and this fork carries ears 51 in which an eye on the end of a piston rod 52 is pivotally connected, as at 53. The rod 52 has a piston 54 on the other end thereof, working in a one-way hydraulic cylinder 55 that is oscillatably supported on the hitch extension 19 of the frame 7, as at 56, a flexible hose 57 being connected with the cylinder 55 to deliver oil under pressure behind the piston 54, under manual control from the tractor, to swing the fork 50 in a counter-clockwise direction and, accordingly, elevate the harrow, as appears in Fig. 5. When the harrow is raised in this way, the clevis 44, which was previously in the raised position shown in Fig. 6, must be adjusted downwardly by means of a screw (not shown) operable by means of a crank 58 to lower the plunger 59 relative to the guide 60 and swing the clevis-carrying arm 61 downwardly relative to the front end of the hitch 19 on its pivot 62, the guide 60 being pivoted to the hitch at 63 to be free to oscillate to the small extent necessary in the up and down adjustment of the arm 61. The clevis 44 is pivoted to the free end of the arm 61 at 64. In the elevation of the harrow, it is usually elevated to a limit position that is determined by the limit position of the piston 54 in its outward movement. The operator merely manipulates a valve on the tractor to admit the oil under pressure to the cylinder 55 when the harrow is to be raised, and he returns the valve to the "Off" position when the harrow is to be lowered again, the harrow then dropping by gravity to whatever depth has been predetermined by the screw adjustment of the cross-pin 65. The pin 65 is carried in the outer end of an adjustable plunger 66 and is shiftable in slots 67 in another pair of ears 68 provided on the fork 50. The screw for adjusting the plunger 66 is indicated at 69 in Fig. 5, and is operable inside a tubular guide 70, in which the plunger 66 is reciprocable. The guide is pivoted at 71 on a fork 72 mounted on the frame 7, and a crank 73 is attached to the rear end of the screw 69 to turn it in either direction. The piston 54 can be disconnected from the fork 50, and the fork can be pivotally connected with the plunger 66 for manual operation of the wheel carriage up and down, when desired. If desired, holes 74 may be provided in the upper end of the fork 50 arranged to register with the pin-hole for pin 65 provided in the plunger 66, so that the pin 65 can be entered in the hole 74 to lock the wheel carriage with the harrow in raised position. That is desirable from a safety standpoint when the harrow is being transported on the highway, because it avoids the necessity for relying upon oil pressure holding the carriage in the "up" position. It also permits locking the carriage in that position so that the tractor furnishing the oil pressure may be disconnected from the harrow and the harrow can then be pulled with a truck, or any other vehicle, independently of an oil pressure source.

It is believed the foregoing description conveys a good understanding of the objects and advantages of my invention. The appended claims have been drawn to cover all legitimate modifications and adaptations.

I claim:

1. In a disk harrow, a horizontal supporting frame carrying thereunder in a horizontal plane a rear pair of gangs of coaxially spaced colter disks arranged in a V-formation diverging rearwardly respectively from the central portion of said frame and a front pair of gangs of coaxially spaced colter disks arranged in a V-formation diverging forwardly respectively from the central portion of said frame, the outer front portions of said frame terminating respectively adjacent the outer portions of said front pair of disk gangs, a hitch structure, said hitch structure including a hitch member extending forwardly from the central portion of said frame and two rearwardly divergent arms, each said arm being connected at its inner front end to said hitch member and being connected at its outer rear end to the corresponding front portion of said frame at a point spaced inwardly from the outer end of said front portion and also spaced inwardly from the outer end of the corresponding front disk gang, a pair of push bars for the outer portions of said front disk gangs, each of said push bars being connected at its rear end to said frame at a point rearwardly of the corresponding outer front portion of said frame and being connected at its front end to the outer portion of the corresponding front disk gang at a point spaced outwardly from the connection of the corresponding front portion of said frame and arm, and a pair of pull bars for the inner portions of said front pair of disk gangs, each of said pull bars being connected at its front end to said hitch structure and being connected at its rear end to the inner portion of the corresponding front disk gang.

2. A disk harrow as defined in claim 1 and which further includes wheels mounted at each side of said frame, each said wheel being located between the corresponding front and rear disk gang outside of said frame and inwardly of the outer extremity of said corresponding rear disk gang.

3. In a disk harrow, a horizontal supporting frame carrying thereunder in a horizontal plane a rear pair of gangs of coaxially spaced colter disks arranged in a V formation diverging rearwardly respectively from the central portion of said frame under the rear portion thereof, and a front pair of gangs of coaxially spaced colter disks arranged in a V formation diverging forwardly respectively from the central portion of said frame under the front portion thereof, each of said front gangs being disposed with the axis thereof substantially directly below the outer front portions of said frame, the disks of the one pair of gangs facing in opposite directions and the disks of the other pair of gangs being respectively reversed in relation to the disks of the first mentioned pair of gangs, a hitch structure extending forwardly from the central portion of said frame for connection to a towing vehicle, a pair of push bars for transmitting thrust from the frame to the outer end portions of said front disk gangs, each of said push bars being connected at its rear end to said frame rearwardly of the front end thereof and extending downwardly and forwardly and connected at its lower front end to the outer end portion of the related front disk gang, and a pair of pull bars for transmitting thrust from the frame to the inner end portions of said front pair of disk gangs, each of said pull bars being connected at its front end to said hitch structure and extending rearwardly and downwardly therefrom and connected at its lower rear end to the inner end portion of the related front disk gang.

4. A disk harrow as defined in claim 3 and which further includes wheels mounted at each side of said frame, each said wheel being located between the corresponding front and rear disk gang outside of said frame and inwardly of the outer extremity of said corresponding rear disk gang.

5. In a disk harrow, a horizontal supporting frame of hourglass shape providing rearwardly diverging rear members and forwardly diverging front members, the inner ends of the front and rear members being connected to a fore and aft central member that extends forwardly from the frame and defines a part of a hitch structure in front of said frame for attachment of the frame to a towing vehicle, and said frame including fore and aft, substantially parallel, side members connected to the outer ends of the front and rear members, said frame carrying thereunder in a horizontal plane a rear pair of gangs of coaxially spaced colter disks arranged in a V formation parallel to and directly below the rearwardly diverging rear members of the frame, and a front pair of gangs of coaxially spaced colter disks arranged in a V formation parallel to and directly below the forwardly diverging front members of the frame, each of said front gangs being disposed with the axis thereof substantially directly below the outer front portions of said frame, the disks of one pair of gangs facing in opposite directions and the disks of the other pair of gangs being respectively reversed in relation to the disks of the first mentioned pair of gangs, a pair of push bars for transmitting thrust from the frame to the outer end portions of said front disk gangs, each of said push bars being connected at its rear end to the adjacent side member of said frame rearwardly of the front end thereof and extending downwardly and forwardly and connected at its lower front end to the outer end portion of the related front disk gang, and a pair of pull bars for transmitting thrust from the frame to the inner end portions of said front pair of disk gangs, each of said pull bars being connected at its front end to said hitch structure and extending rearwardly and downwardly therefrom and connected at its lower end to the inner end portion of the related front disk gang.

6. A disk harrow as defined in claim 5 and which further includes wheels mounted at each side of said frame, each said wheel being located between the corresponding front and rear disk gang outside of said frame and inwardly of the outer extremity of said corresponding rear disk gang.

References Cited in the file of this patent

UNITED STATES PATENTS

| | | |
|---|---|---|
| 402,789 | Waterhouse | May 7, 1889 |
| 1,220,475 | Treadwell | Mar. 27, 1917 |
| 1,545,895 | Hamilton | July 4, 1925 |
| 1,549,592 | McLaughlin | Aug. 11, 1925 |
| 1,762,633 | Johnson et al. | June 10, 1930 |
| 1,830,761 | Johnson et al. | Nov. 10, 1931 |
| 1,884,273 | Sandeen | Oct. 25, 1932 |
| 2,227,762 | Ronning | Jan. 7, 1941 |
| 2,320,742 | Newkirk | June 1, 1943 |
| 2,458,091 | Moore | Jan. 4, 1949 |
| 2,469,622 | Acton | May 10, 1949 |
| 2,623,341 | Evans et al. | Dec. 30, 1952 |

FOREIGN PATENTS

| | | |
|---|---|---|
| 344,298 | Italy | Nov. 3, 1936 |

OTHER REFERENCES

Farm Implement News, vol. 71, Number 1, dated January 10, 1950. Page 97, Smalley Hydraulic Ram Disk Advertisment. Copy is available in Patent Office Library.